United States Patent
Duty et al.

(10) Patent No.: US 7,044,107 B1
(45) Date of Patent: May 16, 2006

(54) METHOD FOR ENABLING MULTIPLE-DISPLACEMENT ENGINE TRANSITION TO DIFFERENT DISPLACEMENT

(75) Inventors: Mark J Duty, Goodrich, MI (US); Michael J Prucka, Grass Lake, MI (US); Michael A Bonne, Leonard, MI (US); Gregory M Pannone, Rochester Hills, MI (US); Marc H Sullivan, Southfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/087,416

(22) Filed: Mar. 23, 2005

(51) Int. Cl.
*F00D 1/00* (2006.01)

(52) U.S. Cl. .................. 123/362; 123/196 R; 123/366

(58) Field of Classification Search ............ 123/196 R, 123/196 S, 198 D, 198 F, 198 DB, 362, 123/366, 396, 349
See application file for complete search history.

(56) References Cited

U.S. PATENT DOCUMENTS

| | | | |
|---|---|---|---|
| 4,406,262 A * | 9/1983 | Ikeura | 123/339.17 |
| 5,408,974 A | 4/1995 | Lipinski et al. | |
| 5,806,012 A | 9/1998 | Maki et al. | |
| 5,839,409 A | 11/1998 | Denz et al. | |
| 5,970,943 A | 10/1999 | Robichaux et al. | |
| 6,360,713 B1 | 3/2002 | Kolmanovsky et al. | |
| 6,615,804 B1 | 9/2003 | Matthews et al. | |
| 6,701,891 B1 * | 3/2004 | Niki et al. | 123/396 |
| 6,736,108 B1 | 5/2004 | Rayl et al. | |
| 6,752,121 B1 | 6/2004 | Rayl et al. | |
| 6,782,865 B1 | 8/2004 | Rayl et al. | |
| 6,789,525 B1 * | 9/2004 | Ishiguro et al. | 123/396 |
| 2002/0134350 A1 * | 9/2002 | Takano et al. | 123/349 |
| 2003/0075146 A1 * | 4/2003 | Niki et al. | 123/396 |
| 2004/0244744 A1 | 12/2004 | Falkowski et al. | |
| 2004/0244751 A1 | 12/2004 | Falkowski et al. | |
| 2005/0252485 A1 * | 11/2005 | Miyazaki | 123/396 |

OTHER PUBLICATIONS

Bates, B.; Dosdall, J. M.; and Smith, D. H.; "Variable Displacement by Engine Valve Control," SAE Paper No. 780145 (New York, NY; 1978).

Mueller, Robert S.; and Uitvlugt, Martin W.; "Valve Selector Hardware," SAE Publication No. 780146 (New York, NY; 1978).

Fukui, Toyoaki; Nakagami, Tatsuro; Endo, Hiroyasu; Katsumoto, Takehiko; and Danno, Yoshiaki; "Mitsubishi Orion-MD—A New Variable Displacement Engine," SAE Paper No. 831007 (New York, NY; 1983).

(Continued)

*Primary Examiner*—Noah P. Kamen
*Assistant Examiner*—Jason Benton
(74) *Attorney, Agent, or Firm*—Ralph E. Smith

(57) ABSTRACT

A method for enabling a transition of a multiple-displacement engine to a different engine operating displacement includes determining a temperature measure correlated with an instantaneous engine oil temperature at an engine start-up, for example, a detected engine coolant temperature at engine start-up; determining a start-up delay period based on the temperature measure, as with a lookup table of calibratable values; and enabling a displacement mode transition no earlier than when the engine run time since start-up exceeds the start-up delay period.

9 Claims, 1 Drawing Sheet

OTHER PUBLICATIONS

Hatano, Kiyoshi; Iida, Kazumasa; Higashi, Hirohumi; and Murata, Shinichi; "Development of a New Multi-Mode Variable Valve Timing Engine," SAE Paper No. 930878 (New York, NY; 1993).

McElwee, Mark; and Wakeman, Russell; "A Mechanical Valve System with Variable Lift, Duration, and Phase Using a Moving Pivot," SAE Paper No. 970334 (New York, NY; 1997).

Yacoub, Yasser; and Atkinson, Chris; "Modularity in Spark Ignition Engines: A Review of its Benefits, Implementation and Limitations," SAE Publication No. 982688 (New York, NY; 1998).

Zheng, Quan; "Characterization of the Dynamic Response of a Cylinder Deactivation Valvetrain System," SAE Publication No. 2001-01-0669 (New York, NY; 2001).

Leone, T.G.; and Pozar, M.; "Fuel Economy Benefit of Cylinder Deactivation—Sensitivity to Vehicle Application and Operating Constraints," SAE Paper No. 2001-01-3591 (New York, NY; 2001).

Patton, Kenneth J.; Sullivan, Aaron M.; Rask, Rodney B.; and Theobald, Mark A.; "Aggregating Technologies for Reduced Fuel Consumption: A Review of the Technical Content in the 2002 National Research Council Report on CAFÉ," SAE Paper No. 2002-01-0628 (New York, NY; 2002).

Falkowski, Alan G.; McElwee, Mark R.; and Bonne, Michael A.; "Design and Development of the Daimlerchrysler 5.7l Hemi Engine Multi-Displacement Cylinder Deactivation System," SAE Publication No. 2004-01-2106 (New York, NY, May 7, 2004).

2004 Global Powertrain Congress program, Sep. 28-30, 2004, Ford Conference & Event Center, Dearborn, Michigan, USA (9 pages).

Albertson, William, et al [William Albertson, Thomas Boland, Jia-shium Chen, James Hicks, Gregory P. Matthews, Micke McDonald, Sheldon Plaxton, Allen Rayl, Frederick Rozario], "Displacement on Demand for Improved Fuel Economy Without Compromising Performance in GM's High Value Engines," Powertrain International—2004 Global Powertrain Conference, Saline, Michigan, Sep. 29, 2004.

* cited by examiner

METHOD FOR ENABLING MULTIPLE-DISPLACEMENT ENGINE TRANSITION TO DIFFERENT DISPLACEMENT

FIELD OF THE INVENTION

The invention relates generally to methods for controlling the operation of a multiple-displacement internal combustion engine, as may be used to provide motive power for a motor vehicle.

BACKGROUND OF THE INVENTION

The prior art teaches equipping vehicles with "variable displacement," "displacement on demand," or "multiple displacement" internal combustion engines in which one or more cylinders may be selectively "deactivated" or "suppressed," for example, to improve vehicle fuel economy when operating under relatively low-load conditions. Typically, the cylinders are deactivated through use of deactivatable valve train components, such as deactivating valve lifters as disclosed in U.S. patent publication no. U.S. 2004/0244751 A1, in which a supply of pressurized engine oil is selectively delivered from an engine oil gallery to a deactivatable valve lifter through operation of a solenoid valve under the control of an engine control module. Preferably, the engine control module operates the solenoid valve such that the lifter's locking pins are moved between their respective locked and unlocked positions as the lifter's cam lies on the base circle of its corresponding cam surface, thereby minimizing lifter wear and noise. Thus, the triggering of the oil control solenoids is preferably synchronized to either the crankshaft in a pushrod engine, or the cam shaft in an overhead cam engine.

It is also known that, at each engine speed, there is a range of potential solenoid trigger points that produce a proper sequencing of the deactivatable valve train components, and that the viscosity of the oil supplied to the oil gallery has a significant impact on the amount of time required for deactivation, as a more viscous oil will drain more slowly through the solenoid's and/or the actuator's drain passages.

Because oil viscosity increases with decreasing engine oil temperature, the prior art teaches delaying the enablement of engine displacement mode transitions until the engine oil is sure to be warm. Where the additional expense of an oil temperature sensor on the engine has been avoided and, hence, oil temperature cannot be directly detected, the prior art teaches enabling actuator operation for displacement transitions only after a predetermined engine run time after start-up has occurred. However, this prior art approach necessarily prevents early transitions to a more fuel efficient partial-displacement engine operating mode when the instantaneous oil viscosity is otherwise suitable for actuator operation before the timer has run out, as is likely to occur, for example, when restarting the engine after a short engine run-time that does not itself exceed the predetermined minimum run-time.

BRIEF SUMMARY OF THE INVENTION

In accordance with an aspect of the invention, a method for enabling a transition of a multiple-displacement engine to a different engine operating displacement includes determining a temperature measure correlated with an instantaneous engine oil temperature at an engine start-up, for example, as inferred from a detected engine coolant temperature at engine start-up; and determining a first start-up delay period based on the temperature measure, for example, using a lookup table containing empirically-determined values for a suitable delay period based on the engine coolant temperature at engine start-up. The method further includes enabling a displacement mode transition, for example, a transition from a full-displacement engine operating mode to a partial-displacement engine operating mode by deactivating a plurality of deactivatable valvetrain components, once an engine run-timer exceeds the start-up-temperature-based first delay period.

In accordance with another aspect of the invention, engine displacement mode transitions are preferably enabled once the engine run-timer exceeds the greater of either the temperature-based first delay period, or a second delay period, determined during a prior engine start and stored by the engine controller in a suitable nonvolatile memory register for use in the current engine start-up. In a preferred method, the second delay period is based upon an observed time period necessary to reach a desired range of instantaneous oil viscosity that will provide operation of the deactivatable valve train components with a minimum of attendant noise and wear.

In accordance with yet another aspect of the invention, the enablement of an engine displacement mode transition is further preconditioned on at least one additional engine operating parameter exceeding a predetermined minimum value and/or remaining beneath a predetermined maximum value, for example, an inlet air temperature, an engine oil pressure, an ambient barometric pressure, or a detected or determined oil viscosity, as well as an indication of a suitable operating state for the vehicle battery (whose voltage powers the lifter-deactivating solenoid), and the vehicle transmission.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figure 1:
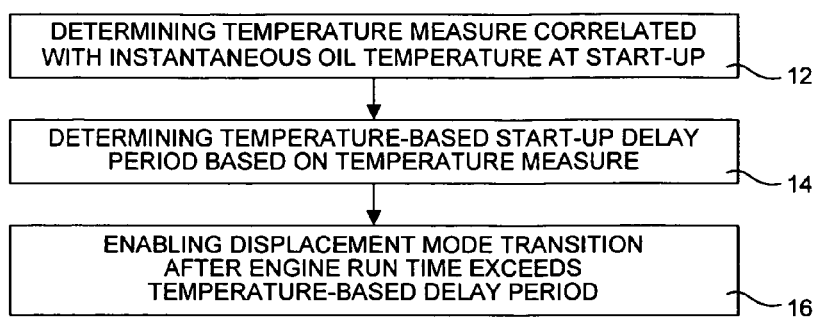
FIG. 1 is a flow chart illustrating the main steps of a method in accordance with an aspect of the invention for enabling a transition of a multiple-displacement engine to a different engine operating displacement.

A method 10 for enabling a transition of a multiple-displacement engine to a different engine operating displacement is generally illustrated in FIG. 1. While the invention is suitable for use with any suitable hydraulic and/or electromechanical systems for deactivating the given cylinder, including deactivatable valve train components, a preferred method is used in conjunction with an eight-cylinder engine in which four cylinders are selectively deactivated through use of deactivatable valve lifters as disclosed in U.S. patent publication no. U.S. 2004/0244751 A1, the teachings of which are hereby incorporated by reference.

As seen in FIG. 1, the method 10 generally includes determining, at block 12, a temperature measure correlated with an instantaneous engine oil temperature at an engine start-up, for example, as inferred from a detected engine coolant temperature at engine start-up. At block 14, a first start-up delay period based on the temperature measure is determined, for example, by retrieving a selected one of a plurality of empirically-determined calibratable values for the first delay period stored in a lookup table based on the detected engine coolant temperature at engine start-up.

At block 16 of FIG. 1, a displacement mode transition, for exam pie, a transition from a full-displacement engine operating mode to a partial-displacement engine operating mode by deactivating a plurality of deactivatable valvetrain components, is enabled only after the engine has been operating for a period in excess of the first delay period, as indicated by an engine run time since start-up that exceeds the first delay period.

Significantly, while an engine run time in excess of the first delay period is a necessary precondition for enabling an engine displacement mode transition, it is preferably not a sufficient condition. Rather, the invention preferably contemplates engine run time as one of several conditions necessary for enabling a desired transition, along with one or more additional engine operating parameters that relate either to the proper operation/timing of the deactivatable components or such other considerations as generated levels of noise, vibration, and harshness (NVH) being above or below respective minimum and maximum values. By way of example, suitable additional engine operating parameters include inlet air temperature, engine oil pressure, ambient barometric pressure, oil viscosity, engine speed, and vehicle speed. Further enablement is also preferably conditioned on an appropriate state or condition of the vehicle transmission coupled to the engine, including the current drive gear selected, and whether the transmission is in a specific predefined operating state such as a "grade mode," "sport" mode, "limp-in" mode, overheat mode; and such other systems as the vehicle battery (whose voltage powers the lifter-deactivating solenoid).

Figure 2:
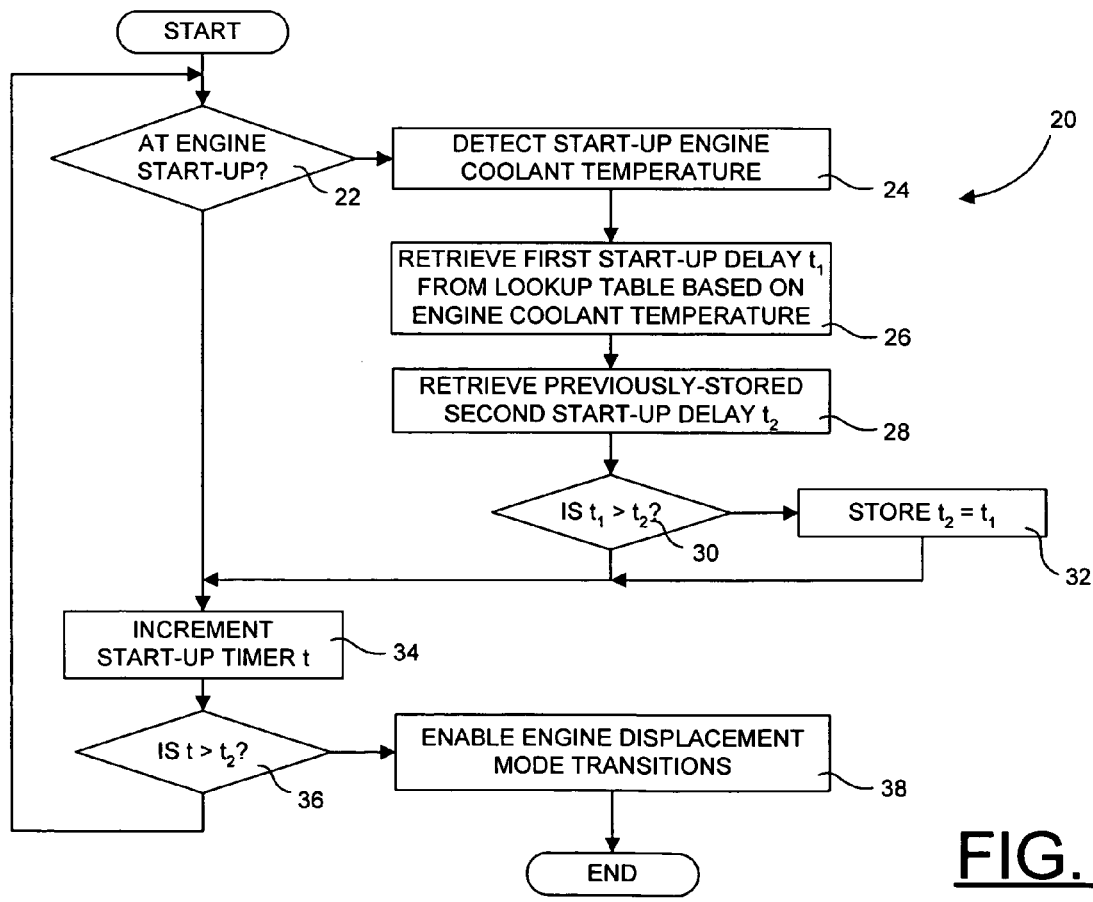
FIG. 2 shows an exemplary computer-executable process for enabling an engine displacement mode transition based on a detected engine coolant temperature at engine start-up.

Referring to FIG. 2, an exemplary computer-executable process 20, suitable for storage in a computer-readable storage medium (not shown), for enabling a transition of a multiple-displacement engine to a different engine operating displacement includes, after determining at block 22 that the engine has just been started up, and detecting an engine coolant temperature at start-up at block 24. It will be appreciated that, in the exemplary process 20, the engine coolant temperature is being used as a convenient surrogate for the engine oil temperature, thereby obviating the need for having a separate oil temperature sensor on the engine.

At block 26 of FIG. 2, a first value $t_1$ for the start-up delay period is retrieved from a lookup table containing a plurality of calibrated values, based on the detected engine coolant temperature. At block 28, a second value $t_2$ for the start-up delay period is retrieved from nonvolatile memory. In the exemplary process 20, the second value $t_2$ for the start-up delay period is based upon an observed time period necessary to reach a desired range of instantaneous oil viscosity that will provide operation of the deactivatable valve train components with a minimum of attendant noise and wear. Again, by way of example only, in an exemplary process 20, the engine oil viscosity is itself determined based on a detected engine oil pressure achieved at a specified engine operating condition, such as a warm engine idle condition, to obviate the need to directly detect the engine oil viscosity.

At block 30 of FIG. 2, the first coolant-temperature-based value $t_1$ for the start-up delay period is compared to the retrieved prior-start-based value $t_2$ for the start-up delay period. If the first value $t_1$ is greater than the second value $t_2$, the first value is stored in the nonvolatile memory for use in a subsequent engine start. At block 34, after incrementing an engine run timer to obtain an engine run time t since start-up, the engine run time t is compared to the second value $t_2$ (which now represents the greater of the first value $t_1$ and the second value $t_2$). If the engine run time t exceeds the second value $t_2$ for the start-up delay, the engine oil temperature is deemed sufficient for actuator operation, and the engine displacement mode transitions are enabled at block 38 (most preferably, subject, for example, to the satisfaction of such other preconditions as described above).

While the above description constitutes the preferred embodiment, it will be appreciated that the invention is susceptible to modification, variation and change without departing from the proper scope and fair meaning of the subjoined claims.

What is claimed is:

1. A method for enabling a transition of a multiple-displacement engine to a different engine operating displacement, the method comprising:
   determining a temperature measure correlated with an instantaneous engine oil temperature at an engine start-up;
   determining a first start-up delay period based on the temperature measure;
   calculating an engine run time since engine start-up;
   comparing the engine run time to the first delay period; and
   enabling a transition when the engine run time exceeds the first delay period.

2. The method of claim 1, wherein the temperature measure represents an engine coolant temperature detected at engine start-up.

3. The method of claim 1, wherein determining the first delay period includes retrieving a calibratable value stored in a lookup table based on the temperature measure.

4. The method of claim 1, further including:
   retrieving a second start-up delay period stored in response to a prior engine start-up; and
   comparing the second delay period with the first delay period; and
   substituting the second delay period for the first delay period when the second delay period is greater than the first delay period.

5. The method of claim 4, wherein the second delay period is determined based on an engine oil viscosity.

6. The method of claim 5, wherein the engine oil viscosity is determined based on a detected engine oil pressure achieved at a warm engine idle condition.

7. The method of claim 1, further including determining an additional measure representing an inlet air temperature, an engine oil pressure, an ambient barometric pressure, and an oil viscosity; comparing the first additional measure to a predetermined minimum value; and enabling the transition when the engine run time exceeds the first delay period only if the first additional measure exceeds the predetermined minimum value.

8. The method of claim 7, further including comparing the additional measure to a predetermined maximum value; and enabling the transition when the engine run time exceeds the first delay period only if the additional measure is less than the predetermined maximum value.

9. The method of claim 1, further including determining whether a transmission coupled to the engine is in a predetermined state; and enabling the transition when the engine run time exceeds the first delay period only if the transmission is in the predetermined state.

* * * * *